Feb. 13, 1973 W. GEUDER 3,716,205

CASSETTE FOR MAGNETIC TAPE OR THE LIKE

Filed Aug. 28, 1970 2 Sheets-Sheet 1

Inventor:
WINFRIED GEUDER
By: [signature]
Attorney

Feb. 13, 1973 W. GEUDER 3,716,205

CASSETTE FOR MAGNETIC TAPE OR THE LIKE

Filed Aug. 28, 1970 2 Sheets-Sheet 2

Inventor:

WINFRIED GEUDER

By: [signature]

Attorney

United States Patent Office 3,716,205
Patented Feb. 13, 1973

3,716,205

CASSETTE FOR MAGNETIC TAPE OR THE LIKE

Winfried Geuder, Furth-Sack, Germany, assignor to Grundig E.M.V. Elektro-Mechanische Versuchsanstalt Inh. Max Grundig, Furth-Bay, Germany Filed Aug. 28, 1970, Ser. No. 67,855
Claims priority, application Germany, Oct. 20, 1969, P 19 52 723.3
Int. Cl. G11b *23/10*
U.S. Cl. 242—194 9 Claims

ABSTRACT OF THE DISCLOSURE

A tensioning device for the non-convoluted portion of magnetic tape whose ends are secured to the cores of coaxial supply and takeup reels mounted in the housing of a cassette or cartridge. The tensioning device has an S-shaped spring one end portion of which is convoluted on a roller which is coaxial with and supported by the supply reel. The other end portion of the spring is convoluted on a roller which is eccentric to and supported by the supply reel. The width of the end portions exceeds the width of the major central portion of the spring and such end portions form shoulders which can abut against complementary shoulders provided on a stop which is integral with the takeup reel. The stop prevents excessive unwinding of the end portions from the respective rollers to thus prevent undue flexing and breakage of the spring ends. The spring winds itself onto the roller of the takeup reel when the rotational speed of the takeup reel exceeds the speed of the supply reel during the first half of transfer of tape onto the takeup reel, and thereupon onto the roller of the supply reel when the speed of the supply reel exceeds the speed of the takeup reel.

BACKGROUND OF THE INVENTION

The present invention relates to cassettes for magnetic tape or the like. More particularly, the invention relates to improvements in cartridge or cassettes of the type wherein the takeup reel is coaxial with the supply reel. Still more particularly, the invention relates to improvements in devices for tensioning that portion of the tape which extends in unconvoluted condition between the supply reel and the takeup reel.

It is already known to mount the supply and takeup reels for magnetic tape in a common housing which can be placed onto the deck of or inserted into a tape recorder. The ends of the tape are secured to the cores of the two reels and a portion of the tape betwen the reels is accessible to be engaged by the drive which is mounted on the tape recorder whereby the tape travels past one or more recording, erasing and/or reproducing heads. It is further known to provide in such cassettes two substantially S-shaped springs which serve to tension that portion of the tape which is not convoluted on the reels. Each spring is associated with one of the reels and their function is to insure that the requisite tensioning of magnetic tape can be achieved without necessitating the provision of a positive drive for either reel. This is particularly important in battery-operated tape recorders to insure economical utilization of electrical energy, i.e., to allow for long-lasting operation with small batteries or for longer-lasting operation with a single large battery. The tape is driven by the capstan which cooperates with an elastic roller to engage the tape between the two reels and to cause its movement past one or more heads.

It is also known to provide a cassette having two coaxial reels with a single S-shaped spring which is caused to store energy while one of the reels rotates faster than the other reel and to dissipate energy while the speed of the other reel exceeds the speed of the one reel.

A drawback of presently known cassettes of the above outlined character is that the useful life of their tape tensioning springs is rather short. This is due to the fact that the ends of the springs are permitted to move from tangential to radial positions wtih reference to their anchoring or retaining means. Such repeated flexing of the spring ends causes fissures and rapid breakage.

SUMMARY OF THE INVENTION

An object of the invention is to provide a cartridge or cassette for magnetic tape or the like wherein the tape tensioning device is constructed and assembled in such a way that it is capable of extended use and that its parts are protected from breakage. Another object of the invention is to provide a novel tensioning device which includes one or more springs and wherein such springs are protected against undesirable flexing when they store maximum or minimum amounts of energy.

A further object of the invention is to provide a tensioning device which does not contribute to the bulk of the cassette and can be produced and installed at a low cost.

An additional object of the invention is to provide a tensioning device which can be installed in many existing types of cassettes with minimal alterations in the basic design of such cassettes.

Another object of the invention is to provide novel springs for use in tensioning devices for cassettes which store magnetic tape or the like.

The invention is embodied in a cassette for elongated web-shaped record carriers, particularly for magnetic tape. The cassette comprises a housing, supply and takeup reels having coaxial cores mounted in the housing for rotation with reference to each other, an elongated carrier having ends connected with the reels, a major portion which is convoluted on at least one of the reels so as to be payed out by such one reel when the latter rotates in a direction to pay out the carrier, and a minor portion which extends between the two reels and can be engaged by a suitable drive of the tape recorder, and novel tensioning means for the minor portion of the carrier. The tensioning means comprises an S-shaped spring having a first end portion mounted on a portion of the one reel and a second end portion mounted on a portion of the other reel, and stop means provided on one of the reels for limiting the extent to which the end portions of the spring can be unwound from the respective reel portions.

The spring has an end portion coiled about a reel portion on one of said reels and windable in a first direction onto said reel portion and unwindable from said reel portion in a second direction towards an ultimate unwound position in which further unwinding movement would tend to uncoil said end portion from about said reel portion. Means are provided for preventing unwinding of said spring to such an extent as to reach such ultimate position.

According to a further concept of the invention, the spring has an end portion fixedly connected to a reel portion and windable in a first direction onto said reel portion, and unwindable in a second direction towards a completely unwound position in which said fixedly connected end portion is subjected to a stress tending to weaken the connection thereof to the reel portion. According to the invention, means may be provided for preventing unwinding of the spring to such an extent as to reach such completely unwound position.

The reel portions can constitute rollers one of which can be coaxial with the reels. The end portions of the spring can be wider than the remaining major portion of the spring to define shoulders which are movable into abutment with complementary shoulders of the stop means.

The novel features which are considered as characteristic of the invention are set forth in particular in the appended claims. The improved cassette itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1A:
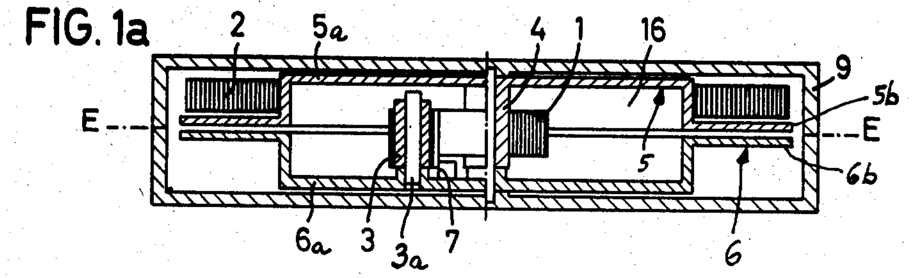
FIG. 1*a* is a sectional view of the cassette as seen in the direction of arrows from the line A–B of FIG. 1.

Referring first to FIGS. 1, 1*a*, 2 and 2*a*, the improved cartridge or magazine comprises a housing 9 of rectangular outline (shown only in FIGS. 1*a* and 2*a*) for two coaxial reels 5, 6. A supply of magnetic recording tape 2 is convoluted on the core **5*a* of the reel 5 which is assumed to be the supply reel. One end of the tape is connected to the core 5*a* and its other end is connected to the core 6*a* of the takeup reel 6. The open ends of the two cores face each other and each of the reels has a single flange shown at 5*b* and 6*b*. These flanges are adjacent to each other. The housing 9 completely encloses the reels 5, 6 and the tape 2 save for a short stretch 20 (indicated in FIGS. 1 and 2 by phantom lines) which can be engaged by the drive means of a tape recorder (not shown) to advance the tape lengthwise from the core 5*a* toward the core 6*a* or vice versa. Such drive means comprises a driven capstan 10 and an elastic roller 11 which is movable toward and away from the capstan to pinch the tape and to advance it at the speed determined by the r.p.m. of the capstan. The manner in which the roller 11 is movable toward and away from the capstan 10 to respectively start and terminate lengthwise movement of the tape 2 forms no part of the present invention. The tensioning device for the relatively short (minor) portion of the tape 2 which is not convoluted on the core 5*a* and/or 6*a* comprises an S-shaped spring 1 resembling a spring which is customarily employed in clockwork mechanisms. The purpose of the spring 1 is to tend to rotate the reels 5, 6 with reference to each other in a direction to tension the non-convoluted minor portion of the tape 2. This spring 1 preferably consists of a narrow strip of spring steel which is shaped, hardened and otherwise treated so that it tends to convolute itself on a roller-shaped retainer 3 mounted on a post or shaft 3*a* which is secured off center to the core 6*a* of the reel 6. The spring 1 is wound in a direction to store energy by rotating the reel 5 in a sense to convolute the spring 1 onto a centrally located roller-shaped hub 4 of the core 5*a*. When it is permitted to wind itself onto the retainer 3, the spring 1** forms a package of closely adjacent convolutions.

The front side wall of the housing 9 has an opening or window (not shown) through which the stretch 20 of the non-convoluted minor portion of the tape 2 extends so as to be readily placed into engagement with the capstan 10 and elastic roller 11. These parts constitute the only drive means for the tape. The stretch 20 is advanced along the customary recording, erasing and/or reproducing head or heads, not shown.

The housing 9 further accommodates means which guides the non-convoluted minor portion of the tape 2 from the core **5*a* to the core 6*a* or vice versa, depending on the direction of travel of the tape. Such guide means comprise preferably frustoconical guide rolls 12, 13, 14 and 15 which are mounted close to the four corners of the internal space in the housing 9 and whose axes can be inclined with reference to the common axis of the reels 5, 6. This insures that the non-convoluted portion of the tape 2 can be guided without lateral flexing. The guide roll 12 is coplanar with the major portion of tape 2 which is convoluted on the core 5*a* and it directs the tape toward the guide roll 13 which is located in a plane substantially midway between the two end walls of the housing 9 at the level of the aforementioned window. The guide roll 14 is coplanar with the roll 13 to insure that the stretch 20 can be advanced without any lateral flexing. The guide roll 15 is coplanar with the core 6*a*. Thus, the tape slants between the rolls 12, 13 and between the rolls 14, 15. The central plane of the stretch 20** is indicated in FIG. 1*a* by the line E—E.

FIG. 1*a* further shows that the spring 1 is installed in the compartment 16 between the cores **5*a*, 6*a* of the reels 5 and 6. In accordance with the prevailing practice, one end portion of this spring is secured to the retainer 3 at the point 18 and the other end portion is secured to the hub at the point 19 (see FIG. 2). When the major portion of the tape 2 is convoluted on the core 5*a* of the supply reel 5** (as shown in FIG. 1*a*), the spring 1 is convoluted mainly on the hub 4 and stores a maximum amount of energy. As the reel 5 rotates in the direction (indicated in FIG. 1 by arrows) to pay out the tape 2, the spring 1 convolutes itself on the retainer 3. In the position shown in FIG. 1, the spring 1 tends to rotate the core **5*a* in a clockwise direction, i.e. counter to the direction of transport of the tape from the core 5*a* toward the core 6*a*. It will be readily understood that the difference between the rotational speeds of the reels 5, 6 is greatest when the core 5*a* begins to pay out the tape 2. When the length of tape which is convoluted on the core 5*a* decreases so that it equals the length which is convoluted on the core 6*a*, the reels 5 and 6** rotate at the same speed, i.e., the difference between such rotational speeds is zero. This is shown in FIGS. 2 and 2*a*; the spring 1 is then convoluted on the retainer 3 and stores a minimum amount of energy because the natural tendency of the spring 1 is to wind itself on the retainer 3.

Figure 1:
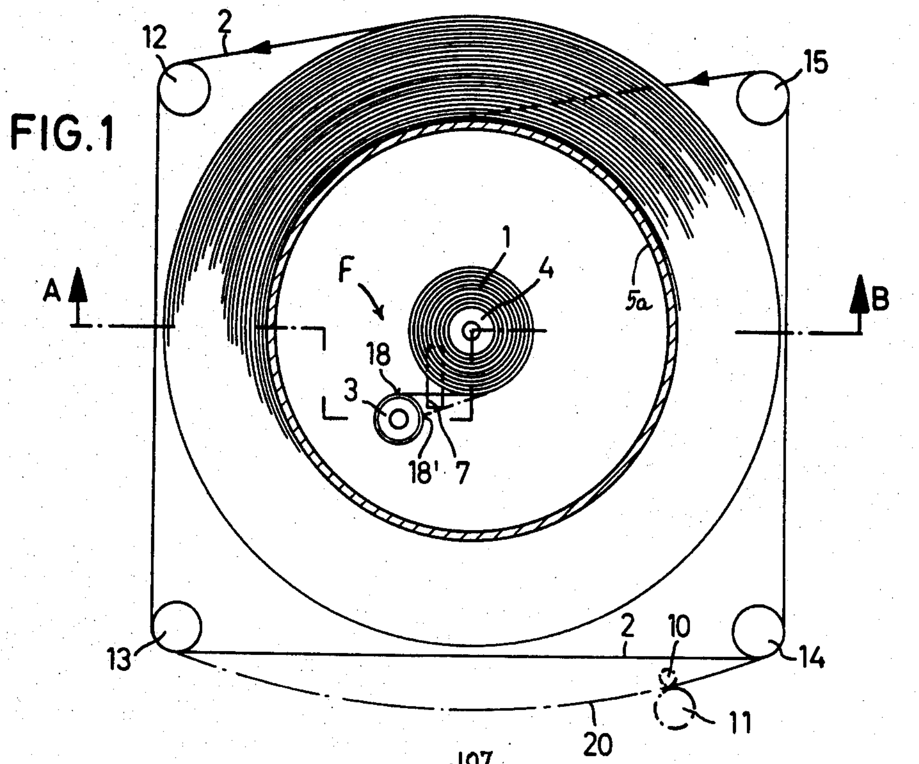
FIG. 1 is a plan view of a cassette which embodies the invention, the housing of the cassette being removed and the tape being convoluted on the takeup reel.

If the tape 2 is pulled through the window of the housing 9 while the spring 1 is fully convoluted on the hub 4 (as shown in FIG. 1), the hub 4 tends to further unwind the spring from the retainer 3 so that the latter tends to move to the position in which the point 18 of connection is moved to 18′. The spring 1 would then extend radially (rather than tangentially) of the retainer 3 and would be deformed by forming a transverse fold immediately adjacent to the point 18′ shown in FIG. 1. This drawback of presently used tensioning springs is highly undesirable because repeated flexing of the spring 1 at the point 18' could cause fissures and complete breakage so that the major portion of the spring would be disconnected from the retainer 3. The material of the spring 1 is rather thin so that it can break in response to a relatively small number of repeated flexures at 18'.

Figure 2A:
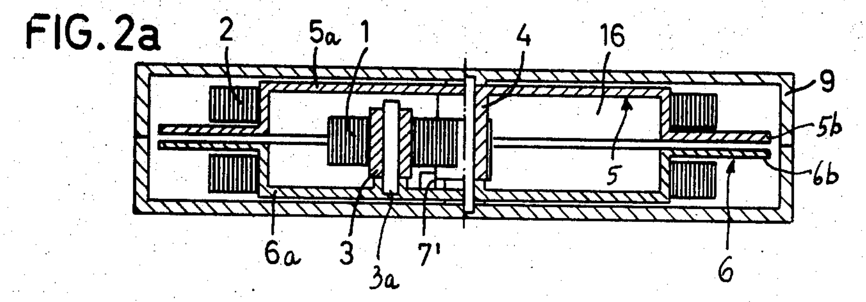
FIG. 2*a* is a sectional view as seen in the direction of arrows from the line C–D of FIG. 2.
Figures 2, 3A:
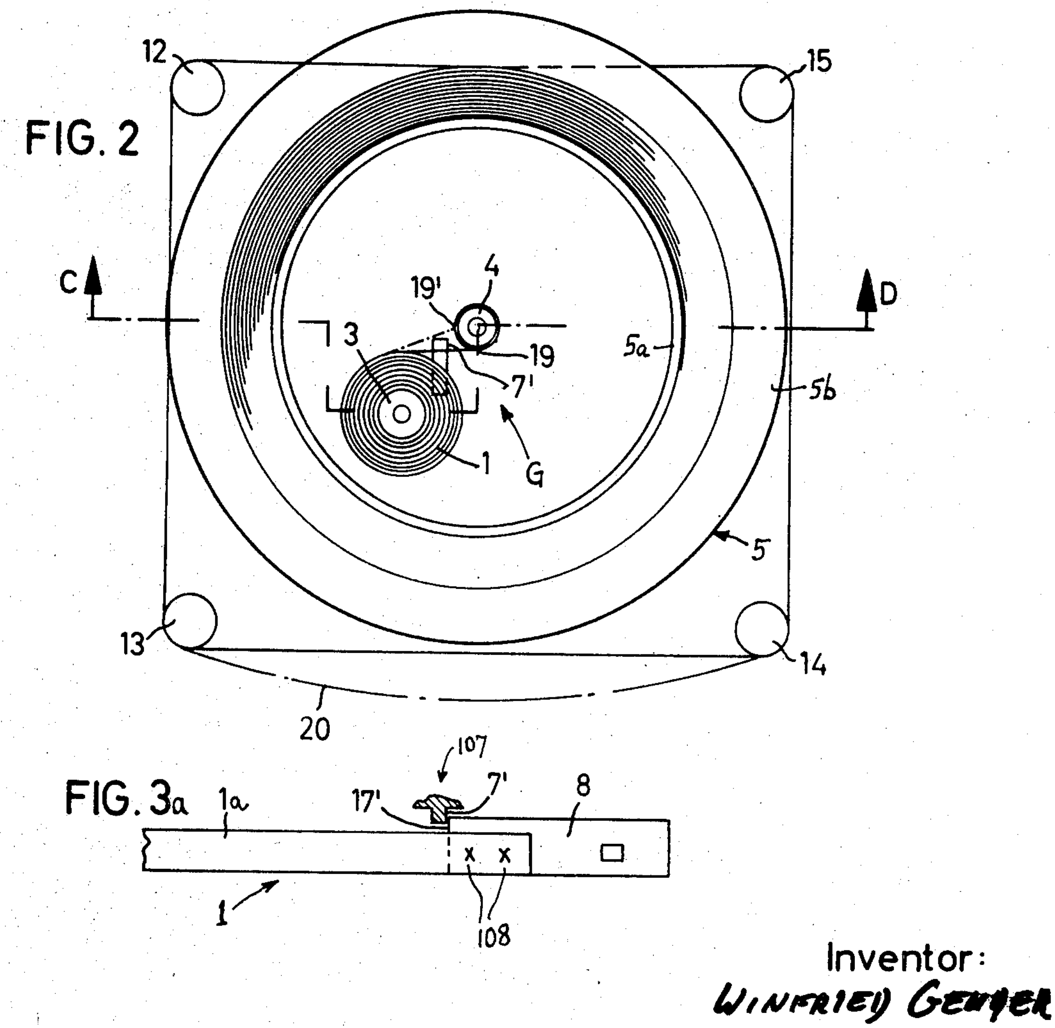
FIG. 2 is a plan view similar to that of FIG. 1 but showing that stage of operation when a tensioning spring is fully convoluted on a portion of the takeup reel.
FIG. 3*a* illustrates a detail as seen in the direction of arrow G in FIG. 2.

FIGS. 2 and 2*a* show the tape 2 in an intermediate position when half the tape is convoluted on the core 5*a* and the remaining half on the core 6*a*. If the stretch 20 is being withdrawn from the housing, the point 19 where the respective end portion of the spring 1 is conventionally secured to the hub 4 tends to move to the position 19' so that the spring 1 extends radially (rather than tangentially) of the hub 4 and is flexed in the same way as described in connection with the position 18' of FIG. 1. This can result in breakage of the respective end of a conventionally mounted spring.

Figure 3:
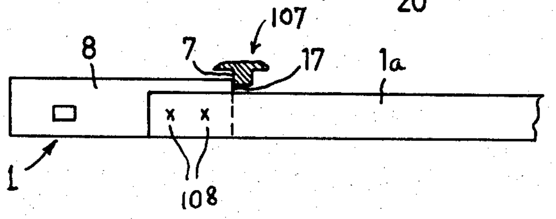
FIG. 3 illustrates a detail as seen in the direction of arrow F in FIG. 1.

A feature of the present invention resides in such construction of the tensioning device (including the spring 1) that the ends of the spring are not flexed but invariably extend tangentially of the retainer 3 or hub 4. This is achieved by the provision of a specially designed spring and of a stop member 107 having two shoulders 7 and 7'. The end portions 8 of the spring 1 are wider than the remaining major portion 1*a* (see FIGS. 3 and 3*a*) so that the end portions 8 define with the major portion 1*a* two shoulders 17, 17' which are respectively movable into engagement with the shoulders 7, 7' of the stop member 107. The end portions 8 may but need not consist of the same material as the main portion 1. For example, the end portions 8 may be made of springy steel strip stock or of synthetic plastic material and may be welded, glued, soldered or otherwise permanently or separably secured to the main portion 1*a*. The length of the end portions 8 is preferably selected in such a way that each thereof forms at least one convolution around the retainer 3 or hub 4. The means for connecting the end portions 8 to the ends of the main portion 1*a* are shown at 108 (see FIGS. 3 and 3*a*).

The stop member 107 may be made of synthetic plastic material and may be attached to or made integral with the core 6*a* of the reel 6 which latter preferably also consists of synthetic plastic material. For example, the reel 6 and the stop member 107 may be produced in an injection molding or like machine.

When the cartridge or cassette of FIG. 1 is put to use, the major portion of the tape 2 is assumed to be convoluted on the core 5*a*. The major part of the spring 1 is convoluted on the retainer 3 and the shoulder 17 of that end portion 8 which is convoluted around and secured to the hub 4 is in abutment with the shoulder 7 of the stop member 107 (see FIG. 3). The stretch 20 of the tape 2 is then withdrawn from the housing 9 so as to be engaged by the capstan 10. In the absence of the stop member 107 and its shoulder 7, the point 18 on the end portion 8 which is convoluted on the retainer 3 would tend to move to the position 18' to thereby cause flexing of the spring 1. The stop member 107 effectively prevents such flexing during withdrawal of the stretch 20. An analogous situation arises when the tape 2 is convoluted on the cores 5*a* and 6*a* in a manner as shown in FIG. 2. The shoulder 17' of the end portion 8 which is convoluted on the hub 4 then abuts against the shoulder 7' of the stop member 107 (see FIG. 3*a*). If the operator withdraws the stretch 20 (FIG. 2) when the tape is convoluted equally on the cores 5*a* and 6*a*, the shoulder 7' prevents movement of the point 19 to the position 19' to thereby effectively prevent undue flexing of the spring 1.

As the reel 5 continues to rotate in a direction to pay out the film, the major part of the tape 2 is convoluted on the reel 6 and the rotational speed of the reel 5 begins to exceed the rotational speed of the reel 6 whereby the retainer 3 pays out the spring 1 which is then convoluted on the hub 4. When the unwinding of tape 2 from the supply reel 5 is completed, the spring 1 is fully convoluted on the hub 4 in the same way as shown in FIG. 1 whereby the shoulder 17 abuts against the shoulder 7 of the stop member 107 (see FIG. 3). The cassette is then removed from the tape recorder and is reinserted in inverted condition. The reel 6 becomes the supply reel and the reel 5 becomes the takeup reel. The spring 1 thereupon travels in the same way as described above, as soon as the reel 6 begins to pay out the tape, i.e., the spring fully convoluted on the retainer 3 when the diameter of convoluted tape on the core 6*a* equals the diameter of tape which is convoluted on the core 5*a*, and the spring 1 is then again collected by the hub 4 when the unwinding of tape from the reel 6 is completed.

If an end portion 8 forms one or more convolutions around the retainer 3, its free end need not even be connected to such retainer. It is further clear that the stop member 107 can be replaced with two discrete stops and/or that the shoulders 17, 17' can be replaced with projections, protuberances or analogous parts which can properly engage the shoulder 7 or 7' when the winding of the major part 1*a* of the spring 1 on the retainer 3 or hub 4 is completed. The parts 3 and 4 can be said to respectively constitute portions of the takeup reel 6 and supply reel 5.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. A cartridge for elongated web-shaped carriers, particularly for magnetic tape, comprising a housing; supply and takeup reels having coaxial cores and mounted in said housing for rotation with reference to each other; an elongated carrier having ends connected with said reels, a major portion convoluted on at least one of said reels so as to be payed out by such one reel when the latter rotates in the necessary direction, and a minor portion extending between said reels; and tensioning means for the minor portion of said carrier, comprising an S-shaped spring having a first end portion mounted on a portion of said one reel and a second end portion mounted on a portion of the other reel, said spring exhibiting the tendency to wind itself onto one of said reel portions, each of said spring end portions having a shoulder, and further comprising stop means including first and second stops for the shoulders of said end portions, whereby to limit the extent to which the end portions of said springs can be unwound from the respective reel portions.

2. A cartridge as defined in claim 1, wherein said spring is located between said reels.

3. A cartridge as defined in claim 1, wherein the width of said end portions exceeds the width of the remainder of said spring.

4. A cartridge as defined in claim 3, wherein each end portion of said spring forms at least one convolution about the respective reel portion.

5. A cartridge as defined in claim 1 wherein at least the end portions of said spring consist of metallic material.

6. A cartridge as defined in claim 1, wherein at least the end portions of said spring consist of synthetic plastic material.

7. A cartridge as defined in claim 1, wherein said spring further comprises a springy main portion and means for securing the ends of said main portion to said end portions.

8. A cartridge as defined in claim 1, wherein said spring stores a maximum amount of energy when the carrier is convoluted on one of said reels.

9. A cartridge as defined in claim 1, wherein said reel portions are rollers one of which is coaxial with said reels.

References Cited

UNITED STATES PATENTS

| | | | |
|---|---|---|---|
| 3,252,669 | 5/1966 | Geri | 242—194 |
| 2,996,264 | 8/1961 | Bydgnes | 242—193 |

FOREIGN PATENTS

| | | | |
|---|---|---|---|
| 963,782 | 7/1964 | Great Britain | 242—198 |

GEORGE F. MAUTZ, Primary Examiner

U.S. Cl. X.R.

242—191, 201, 210